United States Patent Office 2,792,754
Patented May 21, 1957

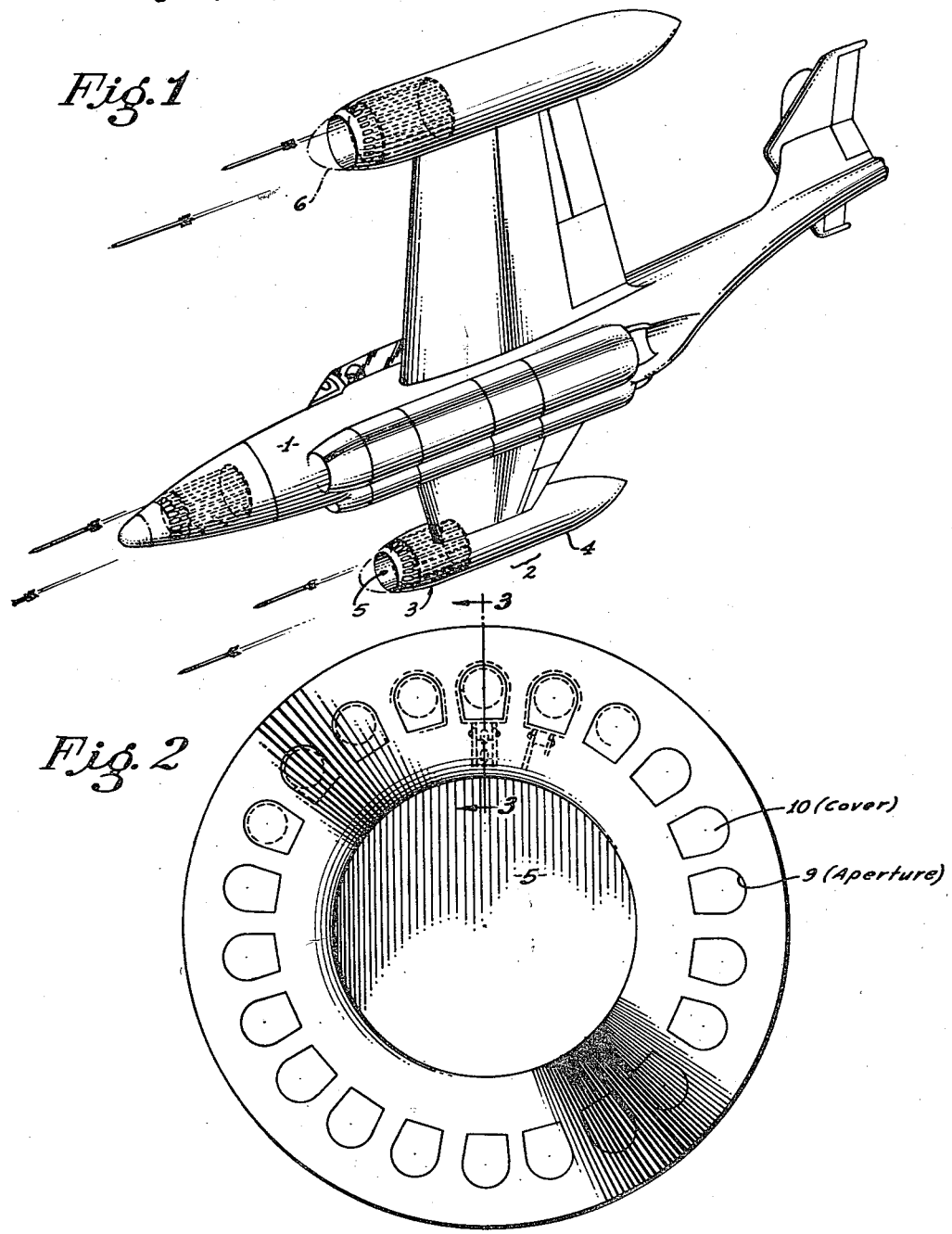

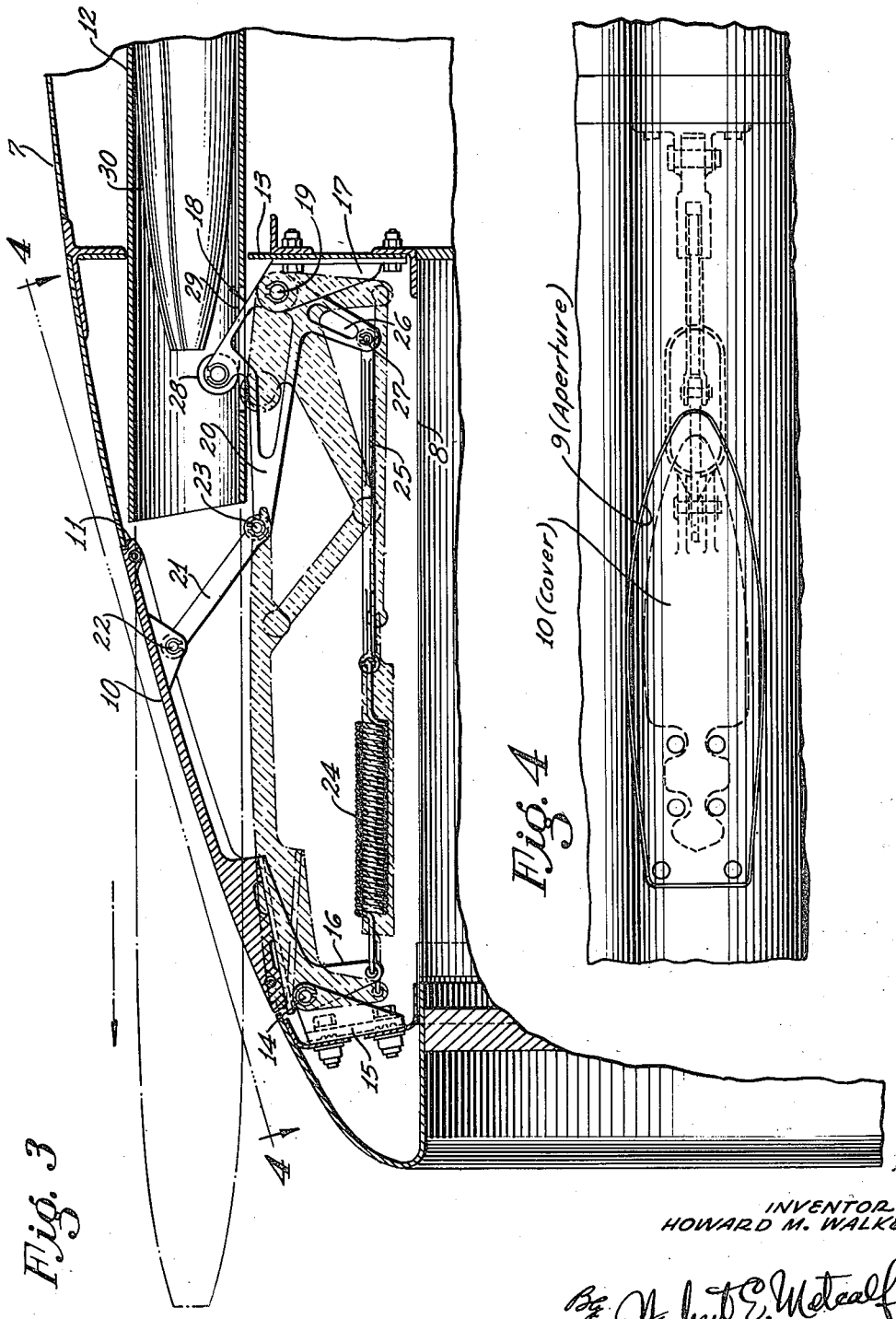

2,792,754
ROCKET TUBE MUZZLE DOOR

Howard M. Walker, Torrance, Calif., assignor to Northrop Aircraft, Inc., Hawthorne, Calif., a corporation of California Application August 14, 1952, Serial No. 304,351

4 Claims. (Cl. 89—1.7)

This invention relates to a rocket launching device and more particularly to rocket launching tubes, which are circumferentially spaced within a wing tip pod or similar streamlined structure of an airplane, having a movable surface ahead of the launching tube which maintains the aerodynamic cleanness of the streamlined structure when the rockets are not being fired.

In military planes it is conventional practice to mount rockets or missiles on the underside of its wings with their axis parallel with the longitudinal center line of the plane. This method of mounting increases the frontal area of the airplane and materially increases its parasite drag.

It is, therefore, an object of the present invention to provide a streamlined structure around a rocket except at such time as the rocket is being fired.

Another object of the invention is to provide a movable surface ahead of a rocket launching tube which will automatically be moved upon firing of a rocket from the tube to a position in which it provides a clear path for the forward movement of the rocket, at all other times maintaining the aerodynamic cleanness of the structure within which the rocket launching tube is mounted.

Other objects and advantages of the present invention will be apparent from the following description forming a part of this specification, however, the invention is not limited to the embodiment herein described as various forms may be adapted within the scope of the appended claims.

Throughout the specification and claims, of the present application, the word "rocket" includes both guided and unguided reaction driven or self propelled missiles.

The invention may be more fully understood by reference to the accompanying drawings, wherein:

Figure 1 is a perspective view of an airplane having wing tip pods in which rocket launching tubes having movable cover elements, of the type disclosed in the present invention, are incorporated.

Figure 2 is a front elevational view of the wing tip pod of Figure 1 provided with rocket launching tube covers of the present invention.

Figure 3 is a sectional view of the wing tip pod of Figure 2 taken on the line 3—3 thereof.

Figure 4 is a plan view as seen from the line 4—4 of Figure 3.

Referring to Figure 1 a jet driven airplane 1 is fitted with wing tip pods 2, the forward portion 3 being utilized for mounting rockets while engine fuel is carried in the aft portion 4. Additional rockets and launching tubes, as disclosed in the present invention, may also be mounted in the nose portion of the airplane.

Also rockets and launching tubes, of the character disclosed in application Serial No. 303,215, dated August 8, 1952 may be mounted in the central portion 5 of the wing tip pods. A frangible pod tip 6 is placed over the central portion to streamline the pods and breaks upon firing of the first rocket.

The forward portion 3 of the wing tip pod comprises inner and outer generally concentric cylindrical members 7 and 8, respectively, joined at the forward ends to provide a streamline contour. The outer surface of the fore and aft portions of the wing tip pods are continuous thus providing a streamline structure.

The outer cylindrical surface of the forward portion of the wing tip pod is provided with a plurality of circumferentially spaced generally triangularly shaped apertures 9 when viewed normal to the surface of the pod. Each of the apertures are provided with a cover 10, capable of closing the apertures and maintaining a flush relationship with the outer cylindrical surface of member 7 in their closed position, as shown by solid line construction of Figure 3. An aid in positioning and retaining the cover is provided by a ledge 11 extending around its periphery, in the cover's closed position the ledge is in abutting relationship with the inner surface of cylinder 7.

The forward ends of the rocket launching tubes 12 are mounted in apertures in a circular plate element 13 positioned in the pod 2 with its circular face normal to the longitudinal axis thereof. Another plate (not shown), but similar in construction to plate 13, is positioned near the aft ends of the rocket tubes and provides additional support therefor. The tubes 12 are circumferentially spaced adjacent the inner surface of cylindrical member 7 and are in longitudinal alignment with the apertures 9.

Each cover 10 is pivotally mounted for movements by suitable linkage between a closed position and a fully open position, the latter position providing a clear path for the forward movement of the rocket, is shown by phantom construction in Figure 3. The above movement of the cover 10 is occasioned by the special configuration and forward movement of the rocket's nose in a manner presently described.

The forward end of cover 10 is mounted to pivot about a hinge pin 14, the pin being supported, near the forward end of the cover, in bearing support 15 secured to a structural element of the wing tip pod. A bracket element, having one arm fixedly secured to the cover, its other arm 16 extending downwardly and generally normal to the face of cover 10, also pivots about hinge pin 14. Secured to the forward side of plate 13 is another bearing support 17 on which a bell crank 18 is mounted to pivot about a hinge pin 19. A link member 21 is pivotally secured between arm 20 of the bell crank and a point near the aft end of cover 10 by means of hinge pins 23 and 22, respectively. A helical spring 24 and connecting link 25 extend between the end portion of depending arm 16 and arm 26 of bell crank 18, the connecting link being pivotally attached to arm 26 by means of hinge pin 27. In position the spring 24 is pre-stressed in such a manner that it will be under tension regardless of the position of arms 16 and 26, so arranged it will exert sufficient force to retain the cover in its closed position or to return it if moved away from its closed position by the linkage mechanism. A roller 28, mounted for rotation on a projecting portion of bell crank 18, extends through an aperture 29 in the wall of tube 12. The roller 28 is normally positioned a short distance ahead of but in the forward path of the rocket when in its normal position prior to firing.

In operation the rocket 30 is fired by any conventional means, such as an igniter (not shown). The nose portion of the rocket is of ogive configuration, as the rocket moves forward its nose portion functions as a camming surface to move roller 28 laterally out of tube 12. As the roller moves laterally from tube 12 it pivots about hinge pin 19, the roller being mounted on a portion of bell crank 18 also causes it to pivot about pin 19. Movement of arm 20 of the bell crank, acting through connecting link 21, causes cover 10 to pivot about hinge pin 14 to a position shown by phantom construction in Figure 3. In the later position of the cover the apertures 9 are free of any obstruction and a clear path is provided for the forward movement of the rocket. Throughout the forward movement of the rocket, within the tube 12, the roller 28 can not re-enter the tube as it will be in contact with the side wall of the rocket. After the rocket has moved forward from tube 12 the force of tension spring 24 is sufficient to return the cover to its closed position, in an obvious manner, and the aerodynamic cleanness of the streamlined structure from which the rocket was fired is restored.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A rocket launching tube having a forward open end, a closure for said open end positioned obliquely with respect to the axis of said tube and rotatably hinged at its forward end, said closure being normally in a position closing said open end, a bell crank mounted near the forward end of said tube, a roller rotatably mounted on one arm of said bell crank and extending a predetermined distance into the path of a rocket which may be fired from said tube, a connecting link extending between said one arm of said bell crank and said cover, a rocket when fired from said tube adapted to force said roller through said predetermined distance, the movement of said roller resulting in said cover pivoting about its forward hinge thereby providing free passage of said fired rocket, and means returning said closure to said normal position after passage of said rocket from said tube.

2. A device as set forth in claim 1 in which the last mentioned means comprises a spring connected to the other arm of said bell crank.

3. A rocket launching tube having a forward open end, a closure for said open end positioned at a very acute angle with respect to the longitudinal axis of said tube and rotatably hinged at its forward end, a depending arm rigidly secured to the forward end of said cover, said closure being normally in a position closing said open end, a bell crank mounted near the forward end of said tube, a roller rotatably mounted on one arm of said bell crank and extending through an opening in the wall of said tube and into said tube a predetermined distance, said roller being located ahead of a rocket when positioned in said tube in firing position, a connecting link extending between said one arm of said bell crank and said cover, a rocket when fired from said tube adapted to force said roller from said tube as it moves forward, the movement of said roller resulting in said bell crank pivoting about its pivot point and rotating said cover about its forward hinge thereby providing free passage for said fired rocket, a spring under tension extending between the other arm of said bell crank and said depending arm for returning the closure to its normal position.

4. In combination with an aircraft having a streamlined leading edge, a rocket launching tube having an open end mounted within the body of said aircraft with the open end thereof presented to but spaced from said leading edge, portions of said leading edge directly ahead of said tube being generally positioned at a very acute angle with respect to the axis of said tube, portions of said leading edge defining an opening therein directly ahead of the open end of said tube, a door normally closing said opening, a hinge pivotally securing said door at its forward end to said aircraft, a bell crank pivotally mounted to said aircraft near the open end of said tube, a roller rotatably mounted on one arm of said bell crank and extending a predetermined distance into the path of a rocket which may be fired from said tube, a connecting link extending between said one arm of said bell crank and said cover, a rocket when fired from said tube adapted to contact said roller and move it through said predetermined distance thus pivoting said cover about said hinge to provide a free forward course for said rocket, and means returning said door to said closed position after passage of said rocket from said tube.

References Cited in the file of this patent

UNITED STATES PATENTS

| 2,445,235 | Myers | July 13, 1948 |
| 2,517,333 | Motley | Aug. 1, 1950 |

FOREIGN PATENTS

| 914,341 | France | June 17, 1946 |